United States Patent
Rajwan et al.

(10) Patent No.: US 9,864,667 B2
(45) Date of Patent: Jan. 9, 2018

(54) TECHNIQUES FOR FLEXIBLE AND DYNAMIC FREQUENCY-RELATED TELEMETRY

(71) Applicant: Intel Corporation, Santa Clara, CA (US)

(72) Inventors: Doron Rajwan, Rishon Le-Zion (IL); Eliezer Weissmann, Haifa (IL); Yoni Aizik, Haifa (IL); Itai Feit, Herzeliya (IL); Tal Kuzi, Tel Aviv (IL); Tomer Ziv, Rishon Lezion (IL); Nadav Shulman, Tel Mond (IL)

(73) Assignee: Intel Corporation, Santa Clara, CA (US)

( * ) Notice: Subject to any disclaimer, the term of this patent is extended or adjusted under 35 U.S.C. 154(b) by 66 days.

(21) Appl. No.: 14/866,584

(22) Filed: Sep. 25, 2015

(65) Prior Publication Data

US 2017/0090945 A1 Mar. 30, 2017

(51) Int. Cl.
*G06F 11/30* (2006.01)
*G06F 11/34* (2006.01)
*G06F 1/32* (2006.01)

(52) U.S. Cl.
CPC ......... *G06F 11/3024* (2013.01); *G06F 1/324* (2013.01); *G06F 1/3228* (2013.01); *G06F 11/3058* (2013.01); *G06F 11/3419* (2013.01); *G06F 11/3452* (2013.01)

(58) Field of Classification Search
CPC ............ G06F 11/3024; G06F 11/3058; G06F 11/3419; G06F 11/3452; G06F 1/324; G06F 1/3228
See application file for complete search history.

(56) References Cited

U.S. PATENT DOCUMENTS

| | | | | |
|---|---|---|---|---|
| 6,816,809 B2* | 11/2004 | Circenis | ............. | G06F 11/3423 702/178 |
| 7,669,067 B2* | 2/2010 | Degenhardt | .......... | G06F 1/3203 713/320 |
| 8,756,446 B2* | 6/2014 | Rancurel | ............... | G06F 1/3203 713/322 |
| 2006/0031691 A1 | 2/2006 | Bacchus et al. | | |
| 2009/0089598 A1 | 4/2009 | Fenger et al. | | |
| 2009/0327656 A1 | 12/2009 | Baum et al. | | |
| 2012/0266179 A1* | 10/2012 | Osborn | ................. | G06F 9/5077 718/105 |

(Continued)

FOREIGN PATENT DOCUMENTS

WO 2017/052741 A1 3/2017

OTHER PUBLICATIONS

International Search Report and Written Opinion received for International Application No. PCT/US2016/043702, dated Nov. 1, 2016, 13 pages.

*Primary Examiner* — Stefan Stoynov
(74) *Attorney, Agent, or Firm* — Alpine Technology Law Group LLC (57) ABSTRACT

Methods and apparatus relating to techniques for flexible and/or dynamic frequency-related telemetry are described. In an embodiment, logic, coupled to a processor, communicates information to a module. The communicated information includes a duration counter value corresponding to a duration in which an operating characteristic of the processor is controlled. Other embodiments are also disclosed and claimed.

25 Claims, 6 Drawing Sheets

(56) References Cited

U.S. PATENT DOCUMENTS

2014/0149769 A1* 5/2014 Brock .................. G06F 1/3237
  713/322
2014/0281612 A1 9/2014 Varma et al.
2014/0317633 A1 10/2014 Zhai

* cited by examiner

TECHNIQUES FOR FLEXIBLE AND DYNAMIC FREQUENCY-RELATED TELEMETRY

FIELD

The present disclosure generally relates to the field of electronics. More particularly, some embodiments relate to techniques for flexible and/or dynamic frequency-related telemetry.

BACKGROUND

As integrated circuit (IC) fabrication technology improves, manufacturers are able to integrate additional functionality onto a single silicon substrate. As the number of these functionalities increases, however, so does the number of components on a single IC chip. Additional components add additional signal switching, in turn, generating more heat. The additional heat may damage an IC chip by, for example, thermal expansion. Also, the additional heat may limit usage locations and/or applications of a computing device that includes such chips. For example, a portable computing device may solely rely on battery power for its operations. Hence, as additional functionality is integrated into portable computing devices, the need to reduce power consumption becomes increasingly important, for instance, to maintain battery power for an extended period of time. Non-portable computing systems also face cooling and power generation issues as their IC components use more power and generate more heat.

To improve power consumption efficiency, some Central Processing Units (CPUs) may allow for adjustments to their operating frequency. However, the decision regarding the frequency adjustment may not be readily visible to system integrators or other users that may be impacted directly by the frequency adjustment.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some embodiments provide techniques for flexible and/or dynamic frequency-related telemetry. In an embodiment, logic (such as logic 150 of FIG. 1, which may be implemented as a system written in firmware running on a processor for example) will communicate with the O/S (Operating System or "OS"). As discussed herein, the communication or interface between the O/S and the processor may interchangeably refer to the communication or interface between a device driver and the processor. Hence, the terms "O/S" and "device driver" may be interchangeable in the context of communication or interface with a processor. The logic may then expose the telemetry data to one or more recipients (such as those directly impacted by modifications to the data, including, for example, system integrator(s) or other user(s)). Furthermore, some embodiments provide techniques for both the logic and the protocol (and/or the interface) used for communication with the O/S and/or device driver.

Moreover, as mentioned above, the decision regarding adjustment to the operating frequency of a processor may not be readily visible to system integrators or other users. For example, to design and/or operate more efficient computing systems, computing system integrators (or other users) may need a way to understand the decisions taken by a processor's power management algorithm(s), regarding frequency clipping and/or shaping, e.g., across different compute domains. This information should be provided in a flexible way in accordance with some embodiments, allowing the recipients to focus on their exact need(s). Also, the information may need to be provided dynamically, allowing the recipients to use it as part of a production system (i.e., during run-time), in high volume, etc., as well as in a laboratory/design environment. In an embodiment, the provisioned information may include a high-order statistics (e.g., and not first order)—that is, the ability to gather statistics on specific case(s) the recipients would like to target.

Figure 1:
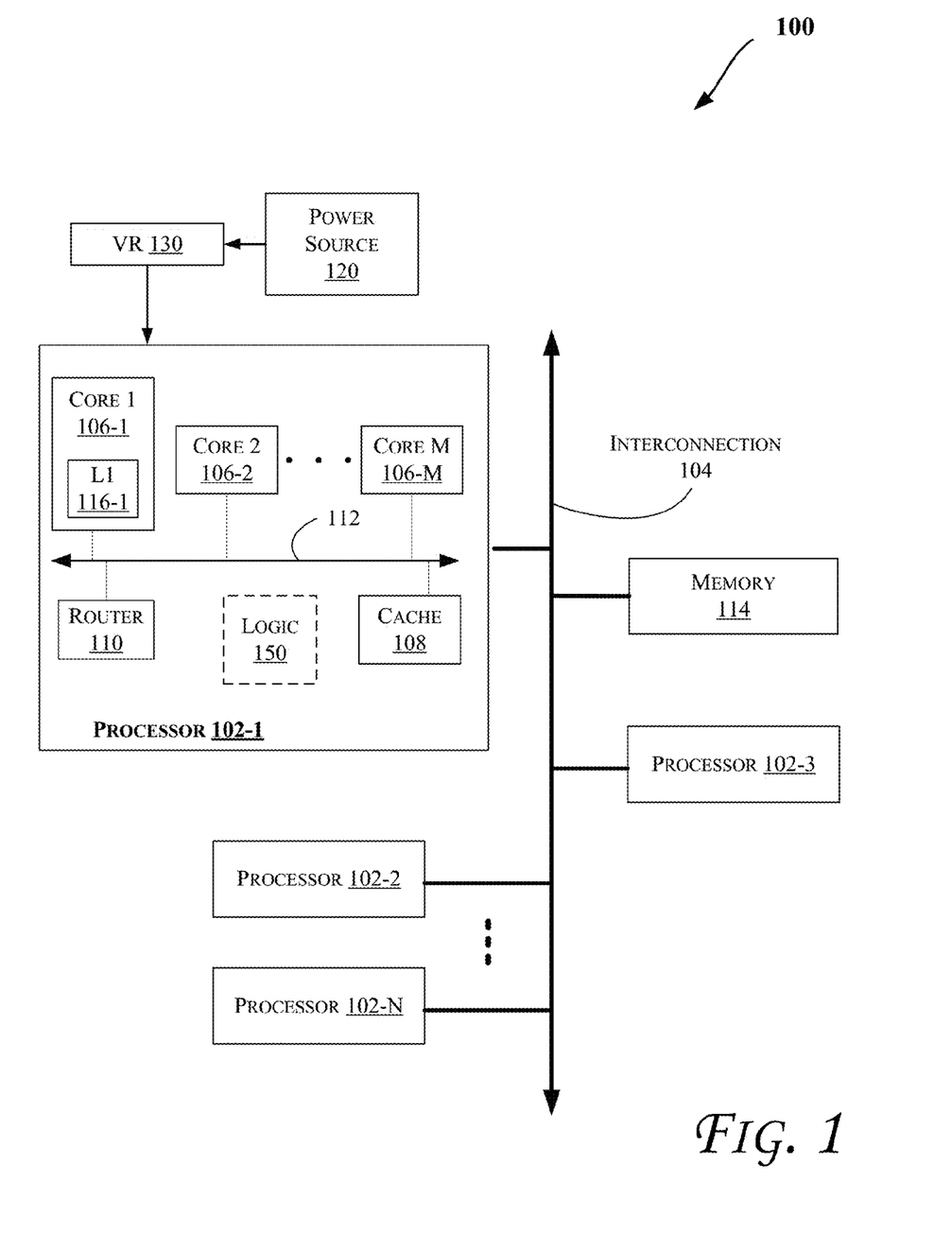
FIGS. 1, 4, 5, and 6 illustrate block diagrams of embodiments of computing systems, which may be utilized to implement various embodiments discussed herein.

Furthermore, some embodiments may be applied in computing systems that include one or more processors (e.g., with one or more processor cores), such as those discussed with reference to FIGS. 1-6, including for example mobile computing devices (and/or platforms) such as a smartphone, tablet, UMPC (Ultra-Mobile Personal Computer), laptop computer, Ultrabook™ computing device, smart watch, smart glasses, wearable devices, etc., and/or larger systems such as computer servers with many cores, etc. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 4-6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a platform power source 120 (e.g., a Direct Current (DC) power source or an Alternating Current (AC) power source) to provide power to one or more components of the system 100. The power source 120 could include a PV (Photo Voltaic) panel, wind generator, thermal generator water/hydro turbine, etc. In some embodiments, the power source 120 may include one or more battery packs (e.g., charged by one or more of a PV panel, wind generator, thermal generator water/hydro turbine, plug-in power supply (for example, coupled to an AC power grid), etc.) and/or plug-in power supplies. The power source 120 may be coupled to components of system 100 through a Voltage Regulator (VR) 130. Moreover, even though FIG. 1 illustrates one power source 120 and a single voltage regulator 130, additional power sources and/or voltage regulators may be utilized. For example, one or more of the processors 102 may have corresponding voltage regulator(s) and/or power source(s). Also, the voltage regulator(s) 130 may be coupled to the processor 102 (and/or cores 106) via a single power plane (e.g., supplying power to all the cores 106) or multiple power planes (e.g., where each power plane may supply power to a different core or group of cores).

As discussed herein, various type of voltage regulators may be utilized for the VR 130. For example, VR 130 may include a "buck" VR (which is generally used in power delivery applications in which an input voltage needs to be transformed to an output voltage in a ratio that is smaller than unity) or a "boost" VR (which is generally used in power delivery applications in which an input voltage needs to be transformed to an output voltage in a ratio that is larger than unity), combinations thereof such as a buck-boost VR, etc. Furthermore, in an embodiment, a dual phase, e.g., that may be extendable to multi-phase three-Level buck VR topology.

Additionally, while FIG. 1 illustrates the power source 120 and the voltage regulator 130 as separate components, the power source 120 and the voltage regulator 130 may be incorporated into other components of system 100. For example, all or portions of the VR 130 may be incorporated into the power source 120 and/or processor 102.

As shown in FIG. 1, system 100 may further include logic 150 to provide flexible and/or dynamic frequency-related telemetry, e.g., as discussed herein with reference to some embodiments. In an embodiment, logic 150 is provided on a Reconfigurable Power Management ICs (RPMICs), such as a PMIC (Power Management IC) and/or an IMVP (Intel® Mobile Voltage Positioning). Such RPMIC implementation(s) may be used in low power devices (such as portable devices discussed herein) through large computer servers such as discussed herein with reference to FIG. 1 or 4-6.

As shown, the logic 150 may be provided in the processor 102. However, embodiments are not limited to this configuration and logic 150 may be alternatively coupled to or incorporated in the VR 130 and/or other components of system 100 such as one or more of the cores 106, and/or the power source 120. Hence, logic 150 may be provide elsewhere in system 100, such as in the core 106, the VR 130, the power source 120, etc.

Figure 2:
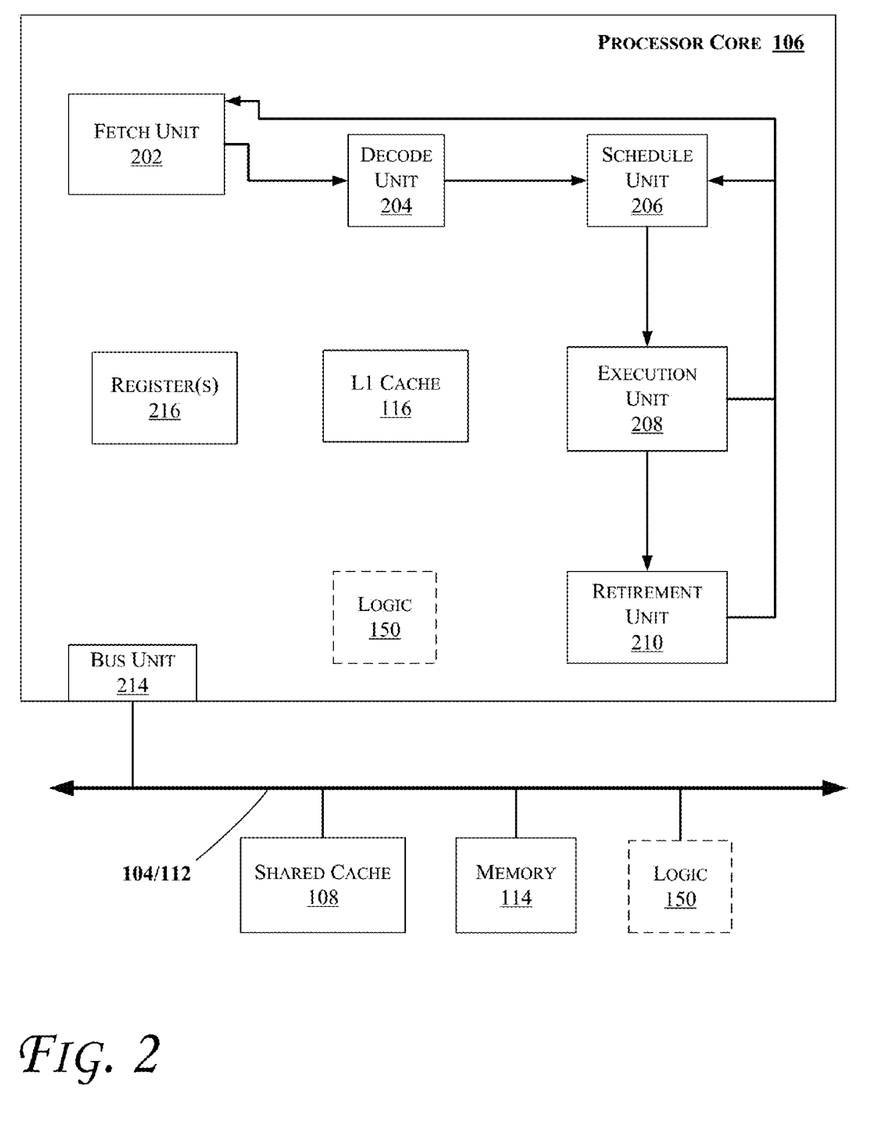
FIG. 2 illustrates a block diagram of portions of a processor core and other components of a computing system, according to an embodiment.

FIG. 2 illustrates a block diagram of portions of a processor core 106 and other components of a computing system, according to an embodiment. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), control units, memory controllers, or other components.

As illustrated in FIG. 2, the processor core 106 may include a fetch unit 202 to fetch instructions (including instructions with conditional branches) for execution by the core 106. The instructions may be fetched from any storage devices such as the memory 114 and/or the memory devices discussed with reference to FIGS. 4-6. The core 106 may also include a decode unit 204 to decode the fetched instruction. For instance, the decode unit 204 may decode the fetched instruction into a plurality of uops (micro-operations). Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution.

The execution unit 208 may execute the dispatched instructions after they are decoded (e.g., by the decode unit 204) and dispatched (e.g., by the schedule unit 206). In an embodiment, the execution unit 208 may include more than one execution unit (such as an imaging computational unit, a graphics computational unit, a general-purpose computational unit, etc.). The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

The core 106 may also include a bus unit 214 to enable communication between components of the processor core 106 and other components (such as the components discussed with reference to FIG. 1) via one or more buses (e.g., buses 104 and/or 112). The core 106 may also include one or more registers 216 to store data accessed by various components of the core 106 (such as values related to assigned app priorities and/or sub-system states (modes) association.

Furthermore, even though FIG. 1 illustrates the logic 150 to be coupled to the core 106 via interconnect 112, in various embodiments logic 150 may be located elsewhere such as inside the core 106, coupled to the core via bus 104, etc.

Figure 3:
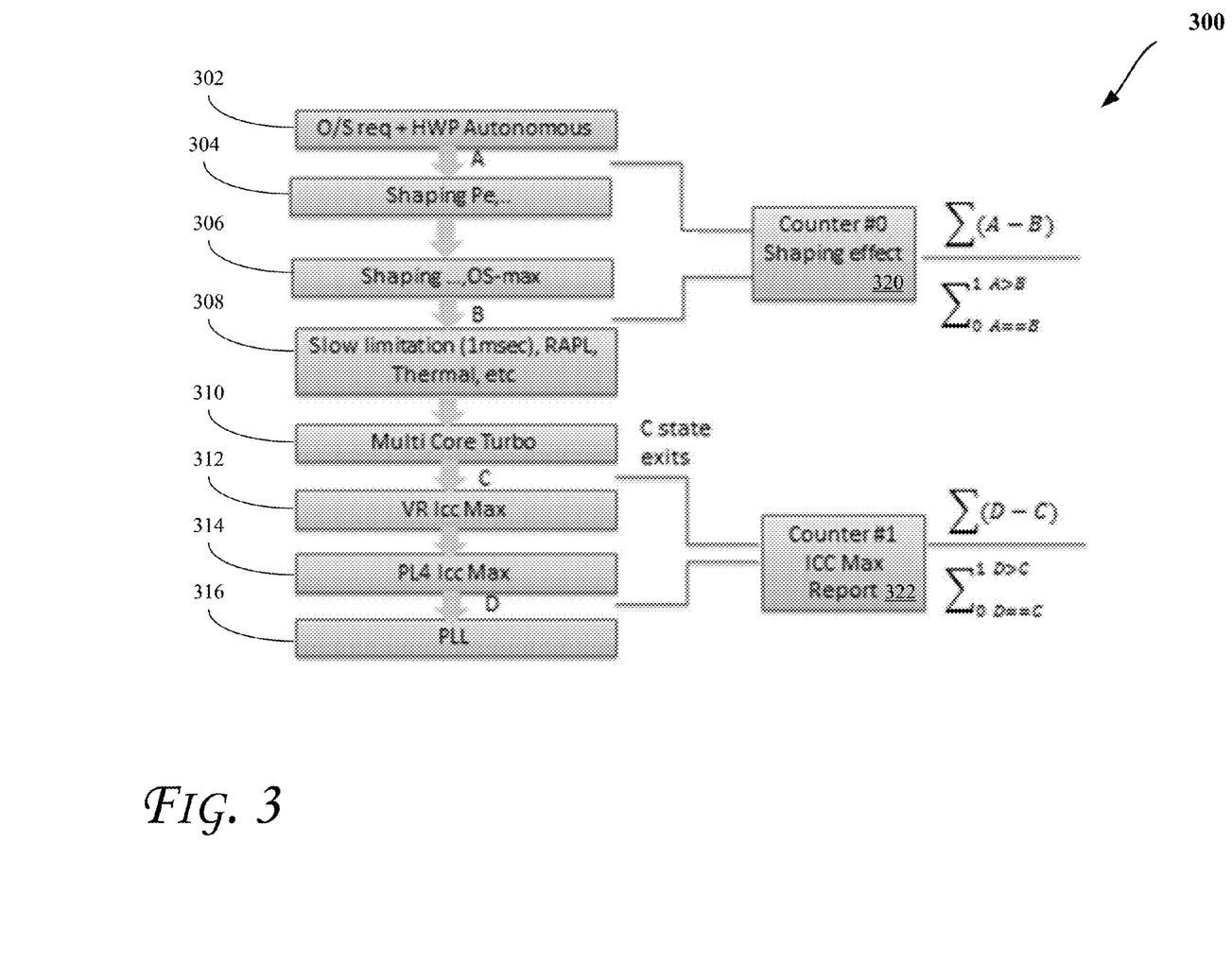
FIG. 3 illustrates a flow diagram in accordance with an embodiment.

FIG. 3 illustrates a flow diagram of a method 300, according to an embodiment. In one embodiment, method 300 shows an example of different points in the stack, selection(s) from the points, and comparison of the values. One or more of the operations of method 300 may be performed by logic (e.g., logic 150).

In some embodiments, the interface between a processor and O/S (or interchangeably a device driver) will support one or more of the following:

a. Ability to count duration in which a processor's operating characteristic was (e.g., operating frequency, thermally (e.g., detected temperature at a component of the processor), power consideration, etc.) limited (or controlled), also referred to as a "duration counter". As discussed herein, "limited" refers to The duration can be stored in a counter (e.g., a 32-bit counter, 64-bit counter, etc.), which counts in some unit of time (e.g., 1.28 us ticks, depending on the implementation), and wraps around or resets after some time (e.g., about 1.5 hours).

b. Ability to count the magnitude of that (i.e., if the logic was limited, how much was it limited, so the magnitude of the limitation), that is, if O/S requested 20, and processor was able to give 17, then this counter (also referred to as a "magnitude counter") will count three times faster than the duration counter (20−17=3, so enough resolution is provided for the counting). Sampling both counters before and after the counts provides a way to know the average magnitude of the (e.g., frequency) clipping.

c. Allow flexible selection of the points to sample. The processor has a complex structure of frequency resolving order, where each node in that tree represents a frequency limit, due to different constraints. An embodiment allows the O/S to choose the pair of points in that tree that are to be compared.

d. Allow flexible domain selection (e.g., for comparison purposes). For example, some processors may support four domains (e.g., referred to general compute engine domain, ring, GT (Graphics) unslice, GT slices), which represent different compute engines. An embodiment allows choosing different engines, and/or mixing them. For example, O/S may choose to compare the frequency to which thermal throttling limits graphics logic operations, and compare it with the frequency that the Ring runs at.

e. Support an offset. This provides the ability not just to compare two points in the above-mentioned tree, but also add an offset to it.

f. Composition. This can be the more complex and unique as will be further discussed below.

Accordingly, some embodiments allow the O/S (and/or device driver) to select (e.g., up to eight pairs of) points, in any compute domain, from within the frequency resolving tree, and calculate the duration or magnitude in which one was bigger than another. As points can depend on previous points, this approach allows for generation of a complex composition (as mentioned under f. above and further detailed below). Moreover, the composition may provide one or more of the following in various embodiments:

g. An embodiment allows for forming a complex composition between counters, hence creating high order statistics. That is, for example, not just to estimate the average of X, but also the average of X given Y, or the average of X given (Y and Z), etc. This allows the Original Equipment Manufacturer (OEM) (e.g., during lab time) or the O/S (during runtime) to understand if "X" went wrong, and if so, the reason if it was because of "Y", or because of "Z", etc.

h. Counter #N (e.g., with 8 counters, N is 0 . . . 7) have N-bit dependency mask, referencing counters #0 to #(N−1).

i. If all bits in this mask are zero, counter will work as described above; no special dependencies.

j. If exactly one mask bit is set, it means that this counter depends on exactly one other (previous) counter. This dependency means that if that other counter did not count, then this counter will not count as well. This allows for implementation of "X given Y".

k. In case that more than one bit is set in the mask, an embodiment supports ALL/ANY rules. The ALL rule means that all dependent counters count; hence, it is an 'AND' on the mask. The ANY rule means that at least one of the dependent counters counts; hence, it is an 'OR' on the mask. There may be a bit of data provided in the interface to specify the ALL/ANY condition. This allows for creating up to 8-th order statistics in an embodiment.

In one embodiment, the processor (and/or logic 150) calculates and/or tracks above-mentioned values during runtime, e.g., based on the afore-mentioned interface description. Also, an embodiment allows for selection of various points of interest, domains, offset, etc., and/or composition or high-order statistics. Moreover, embodiments discussed herein are applicable to all computing devices that have a complex and/or cross-domain frequency control mechanism. This includes but is not limited to all phones, tablets, laptops, Ultrabook computing devices, desktop computers, servers, all-in-one computing devices, etc. such as those discussed herein.

Such embodiments are believed to shorten the time to market for computing products. Also, the runtime optimization allows the provided telemetry data to be used to improve the platforms, e.g., using better runtime algorithms, creating differentiation between different products, etc.

Referring to FIG. 3, various operations and values used for providing a flexible and/or dynamic telemetry information are shown according to an embodiment. More particularly, an O/S (and/or a device driver) request and HWP (Hardware Performance state, such as Intel® Speed Shift™) autonomous request is received (302) as discussed above. Shaping Pe (or shaping Performance efficiency, or selecting the most efficient power point) and shaping/OS-max (e.g., shaping or selecting an upper value provided by the OS) are determined (304, 306). Utilizing a relatively slow limitation (e.g., 1 msec), RAPL (Running Average Power Limit), a duration for operational change(s), thermal, and other information is provided (308). As shown in FIG. 3, the information from operations 302, 304, 306, and 308 are provided to a counter 320 (which may be referred to herein as a "magnitude counter") to determine a corresponding shaping effect.

As shown in FIG. 3, multiple core turbo information 310 (including C state exit information), Voltage Regulator (VR), Icc Max value 312 (or maximum operating current), PL4 Icc Max value 314, and PLL 316 (Phase Locked Loop) information (such as the PLL actual frequency) are provided to a counter 322 (which may be referred to herein as a "duration counter") to generate an Icc Max report (e.g., to provide the physical limitation that may not be exceeded (e.g., not even for a pico second) as it would potentially cause physical damage). In an embodiment, counting in counter #1 322 is performed for a dependency mask if counter #0 320 is counting. As discussed herein, a "turbo" operation (also referred to as turbo boost) allows processor core(s) to run faster than the base operating frequency (for a period of time) assuming they are operating below power, current, and temperature specification limits.

Figure 4:
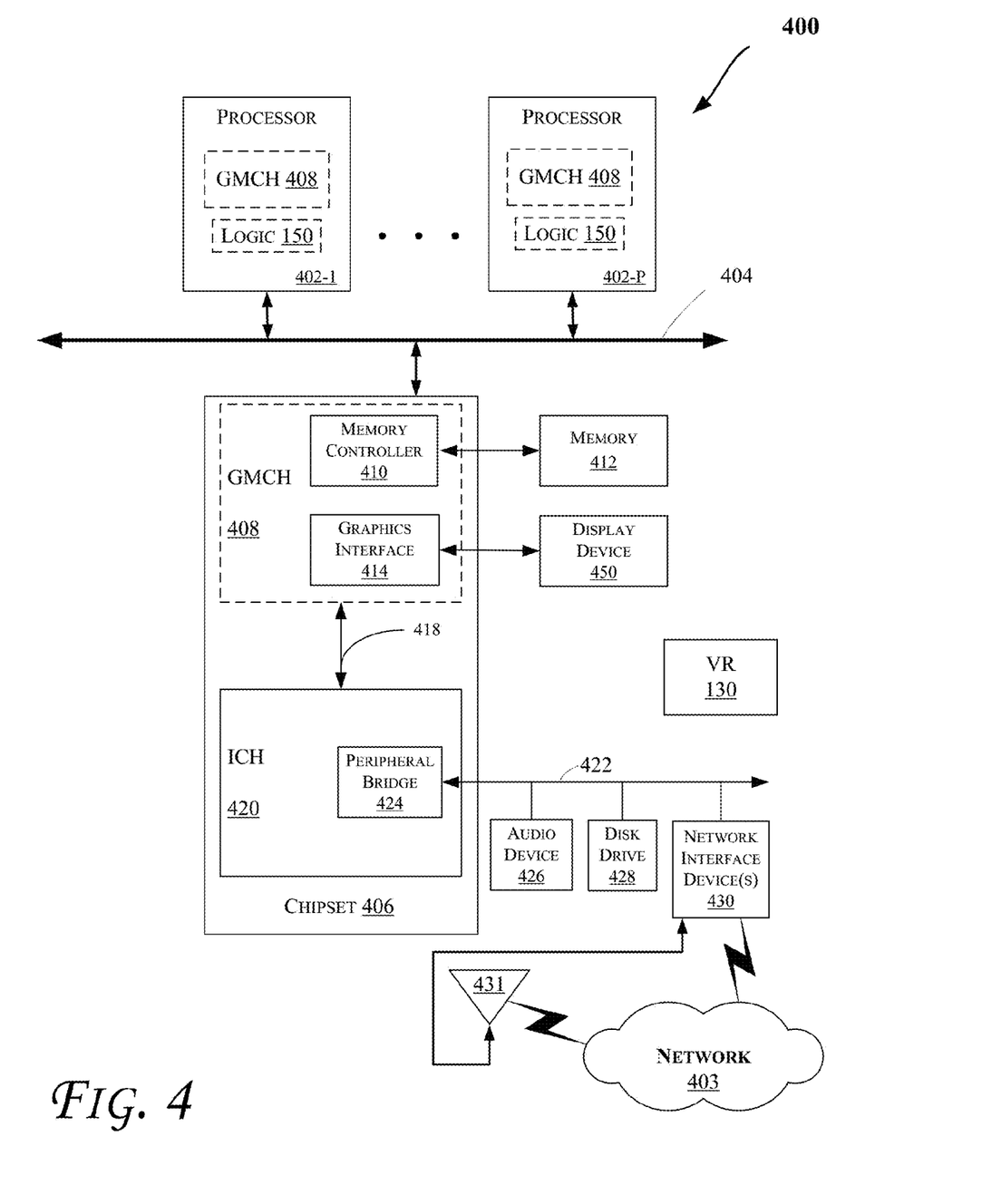

FIG. 4 illustrates a block diagram of a computing system 400 in accordance with an embodiment. The computing system 400 may include one or more central processing unit(s) (CPUs) or processors 402-1 through 402-P (which may be referred to herein as "processors 402" or "processor 402"). The processors 402 may communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. In an embodiment, one or more of the processors 402 may be the same or similar to the processors 102 of FIG. 1. In some embodiments, one or more of the processors 402 may include one or more of the cores 106, VR 130, and/or logic 150 of FIG. 1. Also, the operations discussed with reference to FIGS. 1-3 may be performed by one or more components of the system 400.

A chipset 406 may also communicate with the interconnection network 404. The chipset 406 may include a graphics and memory control hub (GMCH) 408. The GMCH 408 may include a memory controller 410 that communicates with a memory 412. The memory 412 may store data, including sequences of instructions that are executed by the processor 402, or any other device included in the computing system 400. In one embodiment, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The GMCH 408 may also include a graphics interface 414 that communicates with a display device 450, e.g., a graphics accelerator. In one embodiment, the graphics interface 414 may communicate with the display device 450 via an accelerated graphics port (AGP) or Peripheral Component Interconnect (PCI) (or PCI express (PCIe) interface). In an embodiment, the display device 450 (such as a flat panel display (such as an LCD (Liquid Crystal Display), a cathode ray tube (CRT), a projection screen, etc.) may communicate with the graphics interface 414 through, for example, a signal converter that translates a digital representation of an image stored in a storage device such as video memory or system memory into display signals that are interpreted and displayed by the display. The display signals produced may pass through various control devices before being interpreted by and subsequently displayed on the display device 450.

A hub interface 418 may allow the GMCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the processor 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and one or more network interface device(s) 430 (which is in communication with the computer network 403). Other devices may communicate via the bus 422. Also, various components (such as the network interface device 430) may communicate with the GMCH 408 in some embodiments. As shown, the network interface device 430 may be coupled to an antenna 431 to wirelessly (e.g., via an Institute of Electrical and Electronics Engineers (IEEE) 802.11 interface (including IEEE 802.11a/b/g/n, etc.), cellular interface, 3G, 3G, LPE, etc.) communicate with the network 403. Other devices may communicate via the bus 422. In addition, the processor 402 and the GMCH 408 may be combined to form a single chip. Furthermore, the graphics accelerator may be included within the GMCH 408 in other embodiments.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 400 may be arranged in a point-to-point (PtP) configuration. For example, processors, memory, and/or input/output devices may be interconnected by a number of point-to-point interfaces.

Figure 5:
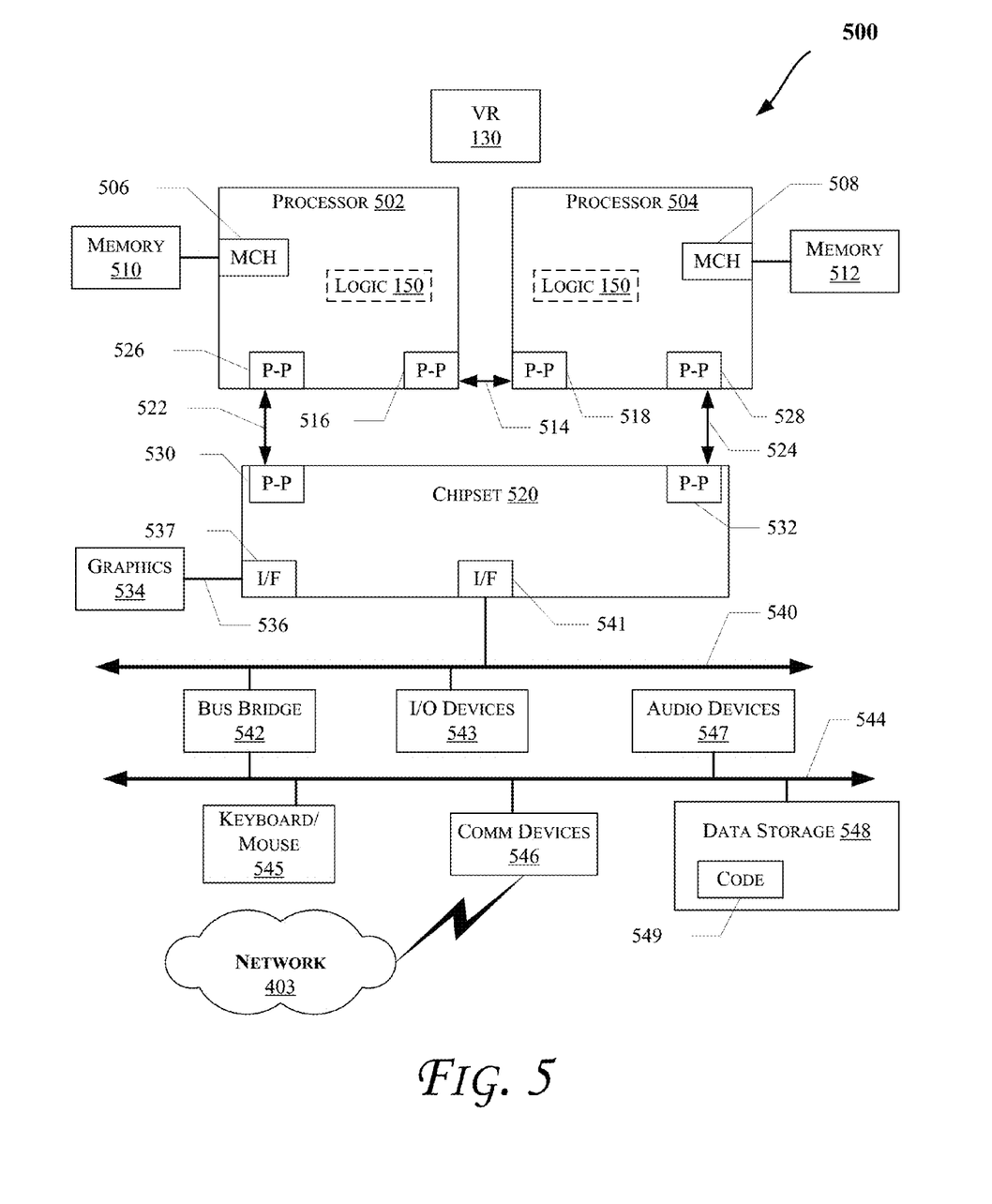

FIG. 5 illustrates a computing system 500 that is arranged in a point-to-point (PtP) configuration, according to an embodiment. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4. Also, the processors 502 and 504 may include one or more of the cores 106, logic 150, and/or VR 130 of FIG. 1.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

In at least one embodiment, one or more operations discussed with reference to FIGS. 1-5 may be performed by the processors 502 or 504 and/or other components of the system 500 such as those communicating via a bus 540. Other embodiments, however, may exist in other circuits, logic units, or devices within the system 500 of FIG. 5. Furthermore, some embodiments may be distributed throughout several circuits, logic units, or devices illustrated in FIG. 5.

Chipset 520 may communicate with the bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device, and/or a data storage device 548. The data storage device 548 may store code 549 that may be executed by the processors 502 and/or 504.

Figure 6:
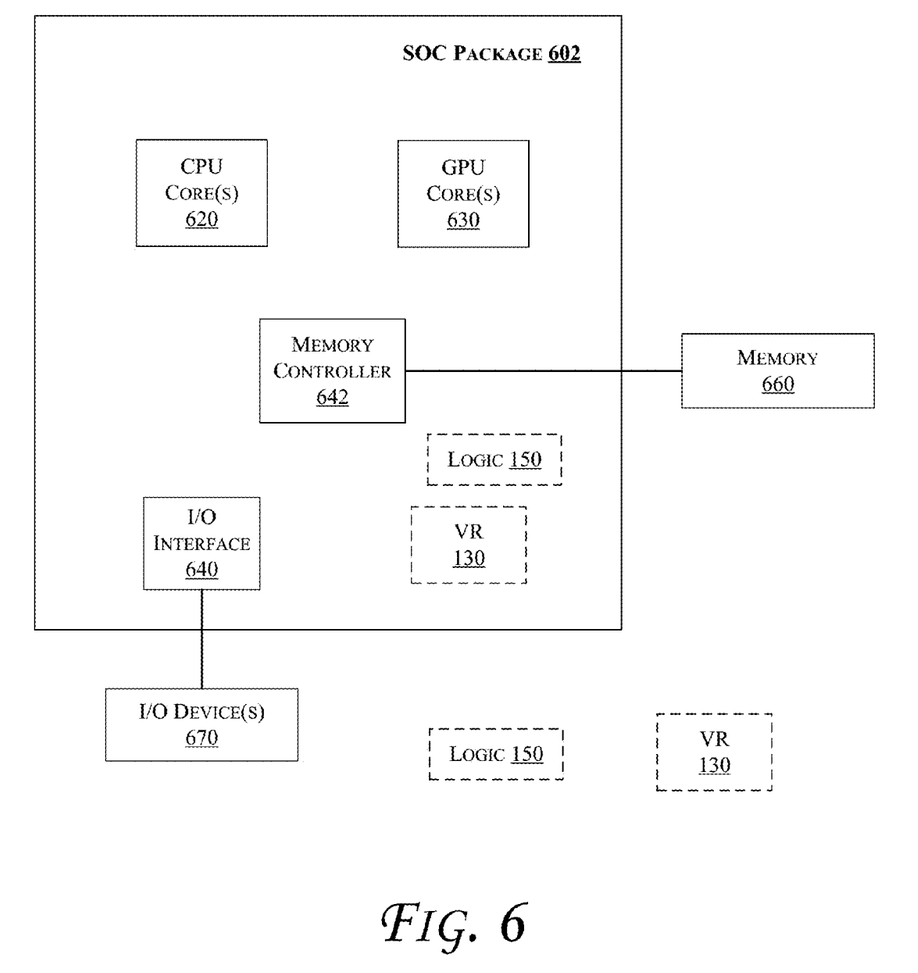

In some embodiments, one or more of the components discussed herein can be embodied as a System On Chip (SOC) device. FIG. 6 illustrates a block diagram of an SOC package in accordance with an embodiment. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 (which may be similar to or the same as memory discussed herein with reference to the other figures) via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display, an image/video capture device (such as a camera or camcorder/video recorder), a touch screen, a speaker, or the like. Furthermore, SOC package 602 may include/integrate the logic 150 and/or VR 130 in an embodiment. Alternatively, the logic 150 and/or VR 130 may be provided outside of the SOC package 602 (i.e., as a discrete logic).

The following examples pertain to further embodiments. Example 1 includes an apparatus comprising: logic, coupled to a processor, to communicate information to a module, wherein the information is to comprise a duration counter value corresponding to a duration in which an operating characteristic of the processor is controlled. Example 2 includes the apparatus of example 1, wherein the information is to comprise a magnitude counter value corresponding to a difference between a magnitude of a requested feature by the module and a magnitude of the requested feature to be provided by the processor. Example 3 includes the apparatus of example 1, wherein the information is to be provided based at least in part on a plurality of points to be selected for sampling. Example 4 includes the apparatus of example 1, wherein the information is to be provided based at least in part on a plurality of domains of the processor to be selected for comparison. Example 5 includes the apparatus of example 1, wherein the information is to be provided based at least in part on a plurality of points with an offset to be selected for comparison. Example 6 includes the apparatus of example 2, wherein the information is to comprise a complex composition between the duration counter and the magnitude counter to provide high order statistics. Example 7 includes the apparatus of example 1, wherein the operating characteristic of the processor corresponds to an operating frequency of the processor or a detected temperature at a component of the processor. Example 8 includes the apparatus of example 1, further comprising a duration counter to store the duration counter value, wherein the duration counter is to be reset after a period of time. Example 9 includes the apparatus of example 1, wherein the module is to comprise an operating system or a device driver. Example 10 includes the apparatus of example 1, wherein the information is tracked during runtime or during a design stage. Example 11 includes the apparatus of example 1, wherein one or more of: the logic, the processor having one or more processor cores, and memory are on a single integrated circuit.

Example 12 includes a method comprising: communicating information to a module, wherein the information comprises a duration counter value corresponding to a duration in which an operating characteristic of a processor is controlled. Example 13 includes the method of example 12, wherein the information comprises a magnitude counter value corresponding to a difference between a magnitude of a requested feature by the module and a magnitude of the requested feature to be provided by the processor. Example 14 includes the method of example 12, further comprising providing the information based at least in part on a plurality of points to be selected for sampling. Example 15 includes the method of example 12, further comprising providing the information based at least in part on a plurality of domains of the processor to be selected for comparison. Example 16 includes the method of example 12, further comprising providing the information based at least in part on a plurality of points with an offset to be selected for comparison. Example 17 includes the method of example 16, wherein the information comprises a complex composition between the duration counter and the magnitude counter to provide high order statistics. Example 18 includes the method of example 12, wherein the operating characteristic of the processor corresponds to an operating frequency of the processor or a detected temperature at a component of the processor.

Example 19 includes the method of example 12, further comprising a duration counter storing the duration counter value, wherein the duration counter is to be reset after a period of time. Example 20 includes the method of example 12, wherein the module comprises an operating system or a device driver. Example 21 includes the method of example 12, further comprising tracking the information during run-time or during a design stage.

Example 22 includes a computing system comprising: memory to store data; a processor, coupled to the memory, to perform one or more operations on the stored data; and logic, coupled to the processor, to communicate information to a module, wherein the information is to comprise a duration counter value corresponding to a duration in which an operating characteristic of the processor is controlled. Example 23 includes the system of example 22, wherein the information is to comprise a magnitude counter value corresponding to a difference between a magnitude of a requested feature by the module and a magnitude of the requested feature to be provided by the processor. Example 24 includes the system of example 22, wherein the information is to be provided based at least in part on a plurality of points to be selected for sampling. Example 25 includes the system of example 22, wherein the information is to be provided based at least in part on a plurality of domains of the processor to be selected for comparison. Example 26 includes the system of example 22, wherein the information is to be provided based at least in part on a plurality of points with an offset to be selected for comparison. Example 27 includes the system of example 26, wherein the information is to comprise a complex composition between the duration counter and the magnitude counter to provide high order statistics. Example 28 includes the system of example 22, wherein the operating characteristic of the processor corresponds to an operating frequency of the processor or a detected temperature at a component of the processor. Example 29 includes the system of example 22, further comprising a duration counter to store the duration counter value, wherein the duration counter is to be reset after a period of time. Example 30 includes the system of example 22, wherein the module is to comprise an operating system or a device driver. Example 31 includes the system of example 22, wherein the information is tracked during run-time or during a design stage. Example 32 includes the system of example 22, wherein one or more of: the logic, the processor having one or more processor cores, and memory are on a single integrated circuit.

Example 33 includes an apparatus comprising means to perform a method as set forth in any preceding example. Example 34 comprises machine-readable storage including machine-readable instructions, when executed, to implement a method or realize an apparatus as set forth in any preceding example.

In various embodiments, the operations discussed herein, e.g., with reference to FIGS. 1-6, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
power management logic, which is implemented in hardware, wherein the power management logic is to be coupled to a processor to communicate information to a module, wherein the information is to be exposed to one or more recipients via the module, wherein the one or more recipients are to be directly impacted by the information,
wherein the information is to comprise a duration counter value corresponding to a duration in which an operating characteristic of the processor is controlled, wherein the information is to comprise a magnitude counter value corresponding to a difference between a magnitude of a requested feature by the module and a magnitude of the requested feature provided by the processor, wherein the duration counter value is to be generated based at least in part on detected voltage or current information to provide a physical limitation that may not be exceeded, wherein the magnitude counter value is to be generated based at least in part on a request from the module or hardware shaping information to provide a shaping effect, wherein the information is to comprise a complex composition between the physical limitation to be provided by the duration counter value and the shaping effect to be provided by the magnitude counter value to provide high order statistics.

2. The apparatus of claim 1, wherein the information is to be provided based at least in part on a plurality of points to be selected for sampling.

3. The apparatus of claim 1, wherein the information is to be provided based at least in part on a plurality of domains of the processor to be selected for comparison.

4. The apparatus of claim 1, wherein the information is to be provided based at least in part on a plurality of points with an offset to be selected for comparison.

5. The apparatus of claim 1, wherein the operating characteristic of the processor corresponds to an operating frequency of the processor or a detected temperature at a component of the processor.

6. The apparatus of claim 1, further comprising a duration counter to store the duration counter value, wherein the duration counter is to be reset after a period of time.

7. The apparatus of claim 1, wherein the module is to comprise an operating system or a device driver.

8. The apparatus of claim 1, wherein the information is tracked during run-time or during a design stage.

9. The apparatus of claim 1, wherein one or more of: the logic, the processor having one or more processor cores, and memory are on a single integrated circuit.

10. The apparatus of claim 1, wherein a Reconfigurable Power Management Integrated Circuit (RPMIC) device is to comprise the power management logic.

11. A method comprising:
communicating information to a module, wherein the information comprises a duration counter value corresponding to a duration in which an operating characteristic of a processor is controlled, wherein the information comprises a magnitude counter value corresponding to a difference between a magnitude of a requested feature by the module and a magnitude of the requested feature provided by the processor, wherein the duration counter value is generated based at least in part on detected voltage or current information to provide a physical limitation that may not be exceeded, wherein the magnitude counter value is generated based at least in part on a request from the module or hardware shaping information to provide a shaping effect, wherein the information comprises a complex composition between the physical limitation provided by the duration counter value and the shaping effect provided by the magnitude counter value to provide high order statistics, wherein the information is exposed to one or more recipients via the module, wherein the one or more recipients are directly impacted by the information.

12. The method of claim 11, further comprising providing the information based at least in part on a plurality of points to be selected for sampling.

13. The method of claim 11, further comprising providing the information based at least in part on a plurality of domains of the processor to be selected for comparison.

14. The method of claim 11, further comprising providing the information based at least in part on a plurality of points with an offset to be selected for comparison.

15. The method of claim 11, wherein the operating characteristic of the processor corresponds to an operating frequency of the processor or a detected temperature at a component of the processor.

16. The method of claim 11, wherein a Reconfigurable Power Management Integrated Circuit (RPMIC) device is to perform the communicating.

17. A non-transitory computer-readable medium comprising one or more instructions that when executed on at least one processor configure the at least one processor to perform one or more operations to:
communicate information to a module, wherein the information comprises a duration counter value corresponding to a duration in which an operating characteristic of the processor is controlled, wherein the information is to comprise a magnitude counter value corresponding to a difference between a magnitude of a requested feature by the module and a magnitude of the requested feature provided by the processor, wherein the duration counter value is to be generated based at least in part on detected voltage or current information to provide a physical limitation that may not be exceeded, wherein the magnitude counter value is to be generated based at least in part on a request from the module or hardware shaping information to provide a shaping effect, wherein the information is to comprise a complex composition between the physical limitation to be provided by the duration counter value and the shaping effect to be provided by the magnitude counter value to provide high order statistics, wherein the information is to be exposed to one or more recipients via the module, wherein the one or more recipients are to be directly impacted by the information.

18. The non-transitory computer-readable medium of claim 17, further comprising one or more instructions that when executed on the at least one processor configure the at least one processor to perform one or more operations to provide the information based at least in part on a plurality of points to be selected for sampling.

19. The non-transitory computer-readable medium of claim 17, further comprising one or more instructions that when executed on the at least one processor configure the at least one processor to perform one or more operations to provide the information based at least in part on a plurality of domains of the processor to be selected for comparison.

20. The non-transitory computer-readable medium of claim 17, wherein a Reconfigurable Power Management Integrated Circuit (RPMIC) device is to comprise the power management logic.

21. A computing system comprising:
memory to store data;
a processor, coupled to the memory, to perform one or more operations on the stored data; and
power management logic, which is implemented in hardware, wherein the power management logic is to be coupled to the processor to communicate information to a module, wherein the information is to be exposed to one or more recipients via the module, wherein the one or more recipients are to be directly impacted by the information,
wherein the information is to comprise a duration counter value corresponding to a duration in which an operating characteristic of the processor is controlled, wherein the information is to comprise a magnitude counter value corresponding to a difference between a magnitude of a requested feature by the module and a magnitude of the requested feature provided by the processor, wherein the duration counter value is to be generated based at least in part on detected voltage or current information to provide a physical limitation that may not be exceeded, wherein the magnitude counter value is to be generated based at least in part on a request from the module or hardware shaping information to provide a shaping effect, wherein the information is to comprise a complex composition between the physical limitation to be provided by the duration counter value and the shaping effect to be provided by the magnitude counter value to provide high order statistics.

22. The system of claim 21, wherein the information is to comprise a magnitude counter value corresponding to a difference between a magnitude of a requested feature by the module and a magnitude of the requested feature to be provided by the processor.

23. The system of claim 21, wherein the information is to be provided based at least in part on a plurality of points to be selected for sampling.

24. The system of claim 21, wherein the information is to be provided based at least in part on a plurality of domains of the processor to be selected for comparison.

25. The system of claim 21, wherein a Reconfigurable Power Management Integrated Circuit (RPMIC) device is to comprise the power management logic.

* * * * *